US008527384B2

(12) United States Patent
Mark

(10) Patent No.: US 8,527,384 B2
(45) Date of Patent: Sep. 3, 2013

(54) CURRENCY EQUIVALENCY APPLICATION

(75) Inventor: Timothy James Mark, Berkeley, CA (US)

(73) Assignee: Bank of America Corporation, Charlotte, NC (US)

( * ) Notice: Subject to any disclaimer, the term of this patent is extended or adjusted under 35 U.S.C. 154(b) by 537 days.

(21) Appl. No.: 12/696,659

(22) Filed: Jan. 29, 2010

(65) Prior Publication Data

US 2011/0191225 A1     Aug. 4, 2011

(51) Int. Cl.
G06Q 40/00 (2012.01)
(52) U.S. Cl.
USPC .......................................................... 705/35
(58) Field of Classification Search
USPC .......................................................... 705/35
See application file for complete search history.

(56) References Cited

U.S. PATENT DOCUMENTS

| 7,747,475 | B1 * | 6/2010 | Bowman et al. | 705/26.1 |
| 7,765,136 | B2 * | 7/2010 | Northington et al. | 705/35 |
| 8,036,966 | B2 * | 10/2011 | Brittan et al. | 705/35 |
| 8,060,528 | B2 * | 11/2011 | Graf | 707/770 |
| 2009/0271301 | A1 * | 10/2009 | Clode et al. | 705/30 |

* cited by examiner

Primary Examiner — Jessica Lemieux
(74) Attorney, Agent, or Firm — Michael A. Springs; Moore & Van Allen, PLLC; Padowithz Alce

(57) ABSTRACT

Embodiments of the present invention provide apparatuses and methods for a currency equivalency application for a business activity monitoring (BAM) applications. The currency equivalency application monitors business activities across international processes and systems that deal with multiple types of currencies. The user enters into the currency equivalency application user defined preferences, such as, but not limited to, the BAM application to which to apply the preferences, the type of currencies, value amounts, dates for the actual currency exchange rate, dates for future currency exchange rates, confidence scores, etc. The currency equivalency application identifies the proper exchange rates and in some cases estimates future exchanges rates, and converts the output for currency values in BAM applications into the user defined currency values, which allows the users across the world to quantify and view the currency value outputs in a form that the user understands.

30 Claims, 10 Drawing Sheets

OVERVIEW | MANAGEMENT | EDI | RESEARCH

▽ 5.1 32253

516 — DATA READ STATUS AT 12:24:37

| END TO END | | 520 SEQUENCE # | 522 LAST TRANSFER TIME | 524 BBR READ TIME | 526 STATUS | 528 ELAPSED TIME |
|---|---|---|---|---|---|---|
| 518 ⊞ ECS | | | 10/09/08 12:18 | 10/09/08 12:21 | ○ | 2min. |

512 → 820 997 824 DAILY ⇧
       835 997 824 DAILY ⇧

536

530 820 PAYMENTS - FILES IN PROGRESS
534 TOTAL FILES: 762; TOTAL ITEMS: 73026 TOTAL UNITS: 10,000,000 538 TOTAL ESTIMATED CURRENCY: 14,625,792

| 532 | | | |
|---|---|---|---|
| PROCESSED ON TIME | 0 | PROCESSED ON TIME | 1898 | PROCESSED ON TIME | 1656 |
| AVERAGE CYCLE TIME | 0s | AVERAGE CYCLE TIME | 30s | AVERAGE CYCLE TIME | 32s |
| | | PROCESSED LATE | 0 | PROCESSED LATE | 0 |
| | | REJECTED | 0 | | |

○ 820
PENDING                          IN PROGRESS ○997   PENDING        IN PROGRESS ○824   PENDING        IN PROGRESS
PENDING                     0    PENDING                      66    PENDING                      0
OVERDUE (WARNING)           0    OVERDUE (WARNING)             0    OVERDUE (WARNING)            0
OVERDUE (LATE)              0    OVERDUE (LATE)                1    OVERDUE (LATE)               0
OVERDUE (LATE) - REASSIGNED 0    OVERDUE (LATE) - REASSIGNED   0    OVERDUE (LATE) - REASSIGNED  0

820 PAYMENTS - EXCEPTION DETAIL

| STATUS | SENDER ID | PLATFORM | FILES | EXCEPTION ITEMS |
|---|---|---|---|---|
| 997 824 | | ECS | | |

| ISA CTRL NO | EXCEPTION ITEMS ▽ | TOTAL ITEMS | EXCEPTION UNITS | TOTAL UNITS | TOTAL ESTIMATED EQUIVALENCY |
|---|---|---|---|---|---|
| 1889 | 2 | 8 | 201,500.00 | 814,500.00 | 566,590 |

897 IN PROGRESS STATUS WILL APPEAR YELLOW (WARNING) IF ELAPSED TIME IS >30 MIN. OVERDUE FROM FILE START TIME
997 IN PROGRESS STATUS WILL APPEAR RED (CRITICAL) IF ELAPSED TIME IS >HR.0 MIN. OVERDUE FROM FILE START TIME

| TOTAL ITEMS | EXCEPTION UNITS | TOTAL UNITS | EXCEPTION EST. EQUIVALENCY | TOTAL EST. EQUIVALENCY |
|---|---|---|---|---|
| 6 | 201,500.00 | 804,500.00 | 566,590 | 1,783,400 |

| 997 STATUS | START TIME | 997 ELAPSED TIME | 997 REJECTS | |
|---|---|---|---|---|
| ☺ | 10/08/08 13:23 | 22hr. 58min. 33s | 0 | REASSIGN |

FROM FIG. 5B

CURRENCY EQUIVALENCY APPLICATION

FIELD

This invention relates generally to the field of business activity monitoring ("BAM") systems.

BACKGROUND

Individual economies of countries have expanded globally throughout the years in an effort to cut costs, expand the customer base, attract new talent, etc. While the increase in global commerce has had many positive effects it has also led to an increase in the number of issues for international businesses. For example, some of the issues include poor communication between people, companies, countries, etc., due to the differences in culture, language, currency, etc., which has put a strain on some global commerce. There are nearly 200 countries in the world, with almost as many different types of currencies. With international businesses operating in the majority of countries in the world, businesses and employees working in various countries have to interact with all different types of currency in their daily jobs.

Furthermore, because of the size and scope of businesses in the global economy, many companies must focus on monitoring their business activities in order to track and evaluate the operations in which the companies are involved. With the electronic age of computers and databases, global companies have access to more data than they currently have the ability to monitor. Companies can monitor virtually any aspect of their business activities, in order to accomplish a number of goals, for example, improve customer relations, reduce costs, identify new business opportunities, improve efficiency, etc. Numerous BAM applications have been created over the years to achieve these types of goals.

Despite the expanding number of BAM applications, the vast amounts of data make it a challenge to present the data in an efficient, cost effective, and meaningful way to multiple employees across international businesses. The challenges not only occur due to the size of international businesses and the shear volume of the data, but the challenges are also attributed to the cultural, linguistic, economic, and religious differences between employees of international businesses.

Therefore, based on the state of businesses in the global economy, there is a need to develop apparatuses and methods to provide employees and customers the necessary tools to monitor business activities more effectively on an employee by employee and currency by currency basis.

BRIEF SUMMARY

Embodiments of the present invention address the above needs and/or achieve other advantages by providing apparatuses (e.g., a system, computer program product, and/or other device), methods, or a combination of the foregoing for a currency equivalency application that displays currency amounts in multiple forms for the BAM applications.

Generally, one embodiment of the invention is a currency equivalency application for business activity monitoring ("BAM") applications. The currency equivalency application helps to monitor business activities across international processes and systems that deal with multiple types of currencies. The user enters into the currency equivalency application user defined preferences, such as, but not limited to, the BAM application(s) to which to apply the preferences, the type of currencies, value amounts, dates for the actual currency exchange rate, dates for future currency exchange rates, confidence levels, etc. The currency equivalency application identifies the proper exchange rates (e.g. in some cases estimates future exchange rates), and converts the currency outputs for values in the BAM applications into the user defined currency values. In this way, users across the world can quantify and view currency value outputs in a form that the user understands and is most comfortable with.

One embodiment of the invention is a currency equivalency system for use with a business activity monitoring system that comprises, a memory device that comprises computer-readable program code stored therein, a communication device, and a processing device is operatively coupled to the memory device and the communication device. The processing device is configured to execute the computer-readable program code to receive user input regarding an equivalent currency in which a user wants to display transactions or batch transactions in a business activity monitoring interface. The processing device is further configured to access currency exchange rates for the transactions or batch transactions not in the equivalent currency. The processing device is also configured to calculate equivalent currency values of the transactions or batch transactions. The processing device is further configured to display the equivalent currency values for the transactions or batch transactions in the business activity monitoring interface.

In further accord with an embodiment of the invention, the processing device is configured to execute the computer-readable program code to receive login information from the user and authenticate the user for access to the currency equivalency system.

In another embodiment of the invention, the processing device is configured to execute the computer-readable program code to receive information about the transactions or batch transactions related to a type of currency and a currency value for each transaction being converted into the equivalent currency value. In yet another embodiment of the invention, the transactions or batch transactions are transactions or batch transactions that have been processed at a time in the past, and the equivalent currency values calculated are based on the exchange rates at the time in the past.

In further accord with and embodiment of the invention, the processing device configured to execute the computer-readable program code to access currency exchange rates comprises accessing the currency exchange rates in real-time.

In another embodiment of the invention, the processing device configured to execute the computer-readable program code to access currency exchange rates comprises estimating the currency exchange rates in the future by analyzing past exchange rates.

In yet another embodiment of the invention, the processing device configured to execute the computer-readable program code to calculate the equivalent currency values comprises using the currency exchange rates to convert each transaction into the equivalent currency value and sum the equivalent currency values for multiple transactions based on what transactions or batch transactions are being monitored.

In another embodiment of the invention, the processing device is configured to execute the computer-readable program code to calculate confidence scores for the equivalent currency values. In yet another embodiment of the invention, the confidence scores are calculated by determining the variation of the exchange rates used to calculate the equivalent currency values over time.

In further accord with an embodiment of the present invention, the processing device is configured to execute the computer-readable program code to receive user input regarding a confidence score that the currency equivalency system uses to calculate the equivalent currency values.

One embodiment of the invention comprises a computer program product for a currency equivalency application for use with a business activity monitoring application. The computer program product comprises at least one computer-readable medium having computer-readable program code portions embodied therein. The computer-readable program code portions comprise an executable portion configured for receiving user input regarding an equivalent currency in which a user wants to display transactions or batch transactions in a business activity monitoring interface. The computer-readable program code portions further comprise an executable portion configured for accessing currency exchange rates for the transactions or batch transactions not in the equivalent currency. The computer-readable program code portions further comprise an executable portion configured for calculating equivalent currency values for the transactions or batch transactions. The computer-readable program code portion also comprises an executable portion configured for displaying the equivalent currency values for the transactions or batch transactions in the business activity monitoring interface.

In another embodiment of the invention the computer program product further comprises an executable portion configured for receiving login information from the user and authenticating the user for access to the currency equivalency application.

In another embodiment of the invention the computer program product further comprises an executable portion configured for receiving information about the transactions or batch transactions related to a type of currency and a currency amount for each transaction being converted into the equivalent currency. In further accord with an embodiment of the invention the transactions or batch transactions are transactions or batch transactions that have been processed at a time in the past, and calculating the equivalent currency values is based on the exchange rates at the time in the past.

In yet another embodiment of the invention the executable portion configured for accessing currency exchange rates comprises an executable portion configured for accessing the currency exchange rates in real-time.

In another embodiment of the invention the executable portion configured for accessing currency exchange rates comprises an executable portion configured for estimating the currency exchange rates in the future by analyzing past exchange rates.

In another embodiment of the invention the executable portion configured for calculating the equivalent currency values comprises an executable portion configured for using the currency exchange rates to convert each transaction into the equivalent currency value and sum the equivalent currency values for multiple transactions based on what transactions or batch transactions are being monitored.

In yet another embodiment of the invention the computer program product further comprises an executable portion configured for calculating confidence scores for the equivalent currency values. In further accord with an embodiment of the invention the confidence scores are calculated by determining the variation of the exchange rates used to calculate the equivalent currency values over time.

In another embodiment of the invention the computer program product further comprises an executable portion configured for receiving user input regarding a confidence score that the currency equivalency application uses for calculating the equivalent currency values.

One embodiment of the invention is a currency equivalency method. The currency equivalency method comprises receiving user input regarding an equivalent currency in which a user wants to display transactions or batch transactions in a business activity monitoring interface, using a processing device operatively coupled to a memory device, and a communication device, and configured to execute computer-readable program code. The method further comprises accessing currency exchange rates for the transactions or batch transactions not in the equivalent currency, using the processing device. The method further comprises calculating equivalent currency values for the transactions or batch transactions, using the processing device. The method also comprises displaying the equivalent currency values for the transactions or batch transactions in the business activity monitoring interface, using the processing device.

In another embodiment of the invention the currency equivalency method further comprises receiving login information from the user and authenticating the user for access to the currency equivalency system, using the processing device.

In yet another embodiment of the invention the currency equivalency method further comprises receiving information about the transactions or batch transactions related to a type of currency and a currency value for each transaction being converted into the equivalent currency, using the processing device. In further accord with an embodiment of the invention the transactions or batch transactions are transactions or batch transactions that have been processed at a time in the past, and calculating the equivalent currency values is based on the currency rates at the time in the past.

In still other embodiments of the invention accessing currency exchange rates comprises accessing the currency exchange rates in real-time, using the processing device.

In another embodiment of the invention, accessing currency exchange rates comprises estimating the currency exchange rates in the future by analyzing past exchange rates, using the processing device.

In yet another embodiment of the invention, calculating the equivalent currency values comprises using the currency exchange rates to convert each transaction into the equivalent currency value and sum the equivalent currency values for multiple transactions based on what transactions or batch transactions are being monitored, using the processing device.

In still other embodiments of the invention the currency equivalency method further comprises calculating confidence scores for the equivalent currency values, using the processing device. In further accord with an embodiment of the invention the confidence scores are calculated by determining the variation of the exchange rates used to calculate the equivalent currency values over time.

In another embodiment of the invention the currency equivalency method further comprises receiving user input regarding a confidence score that the currency equivalency application uses for calculating the equivalent currency values.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
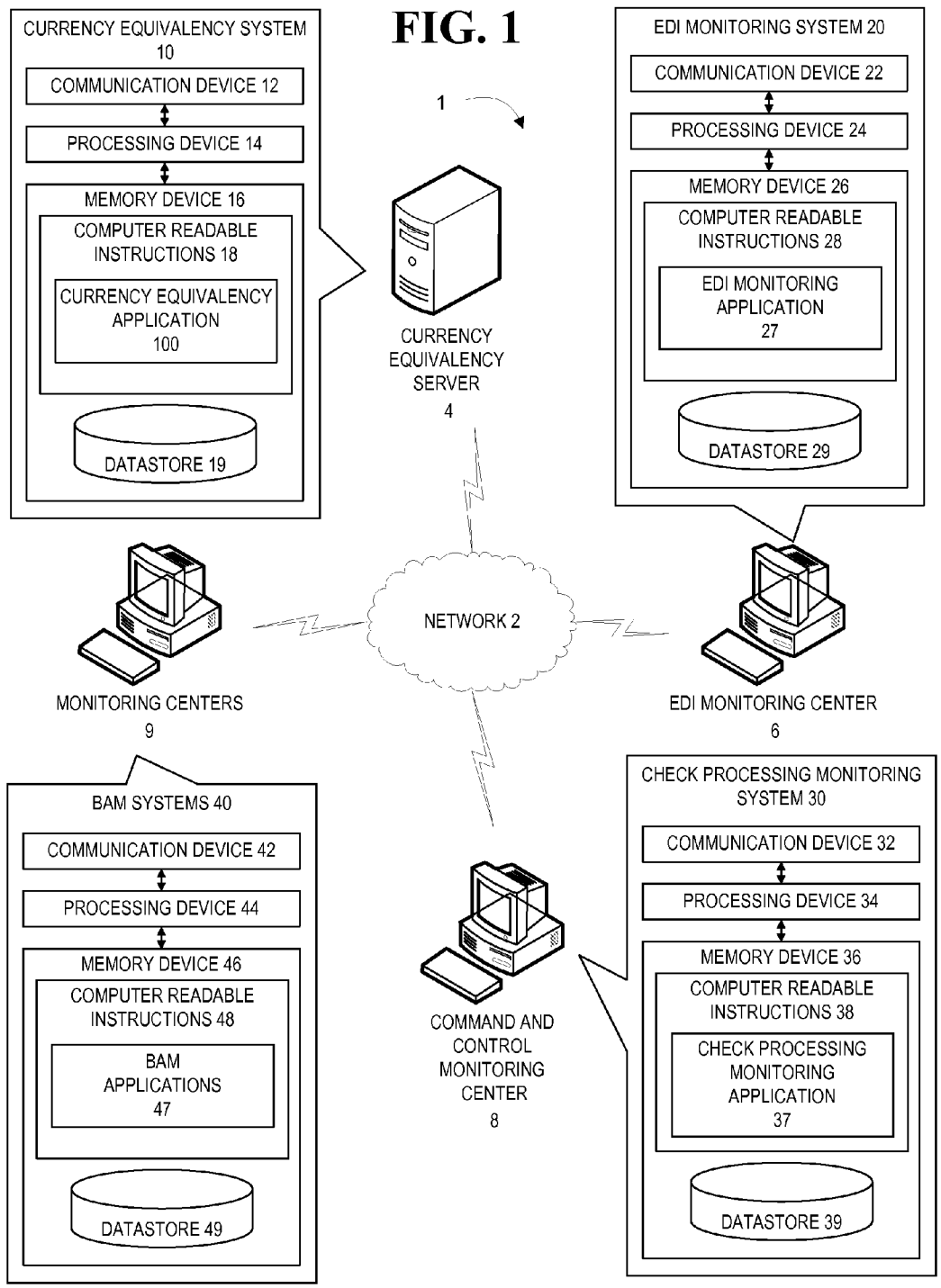
Figure 2:
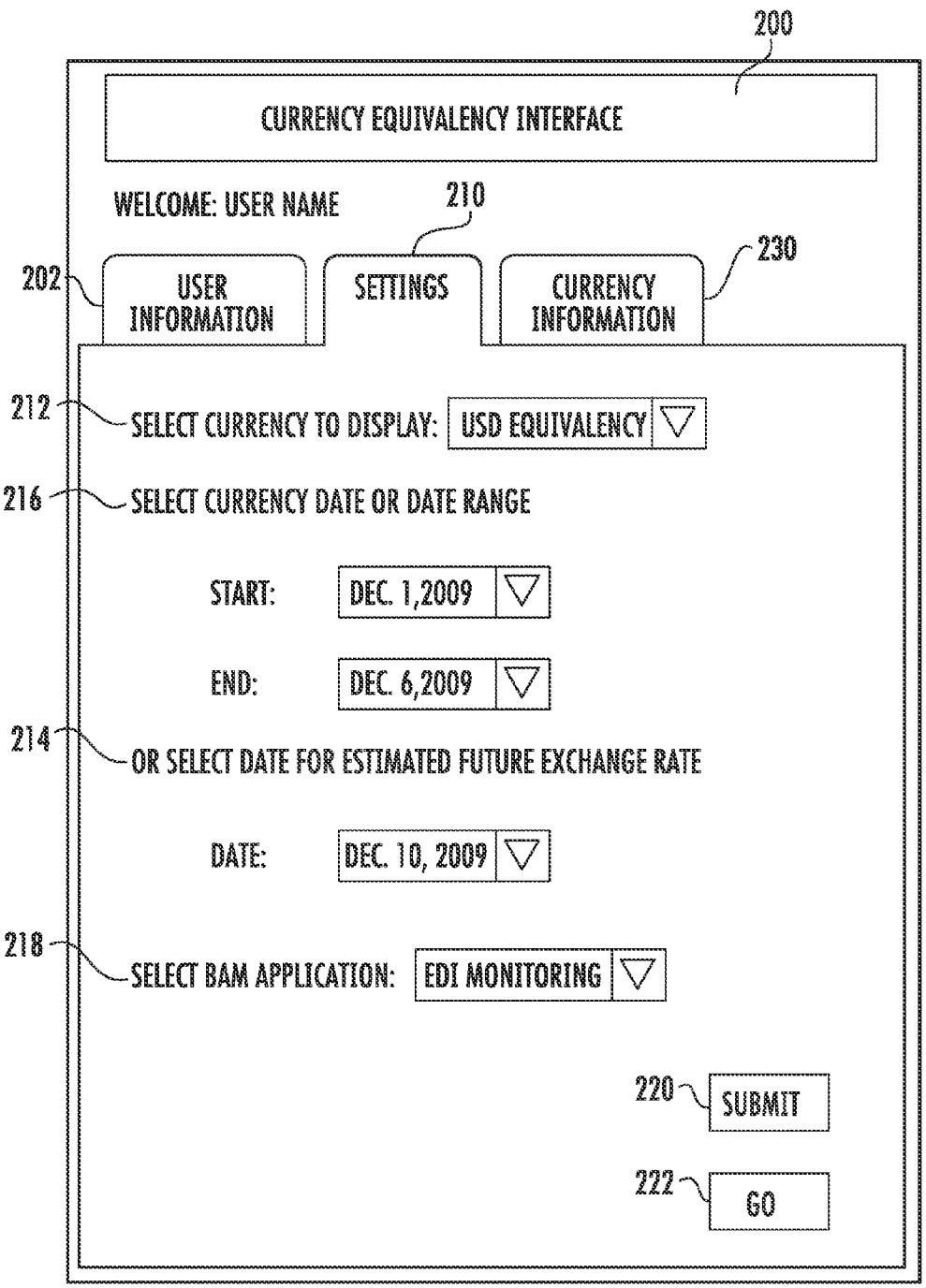
Figure 3:
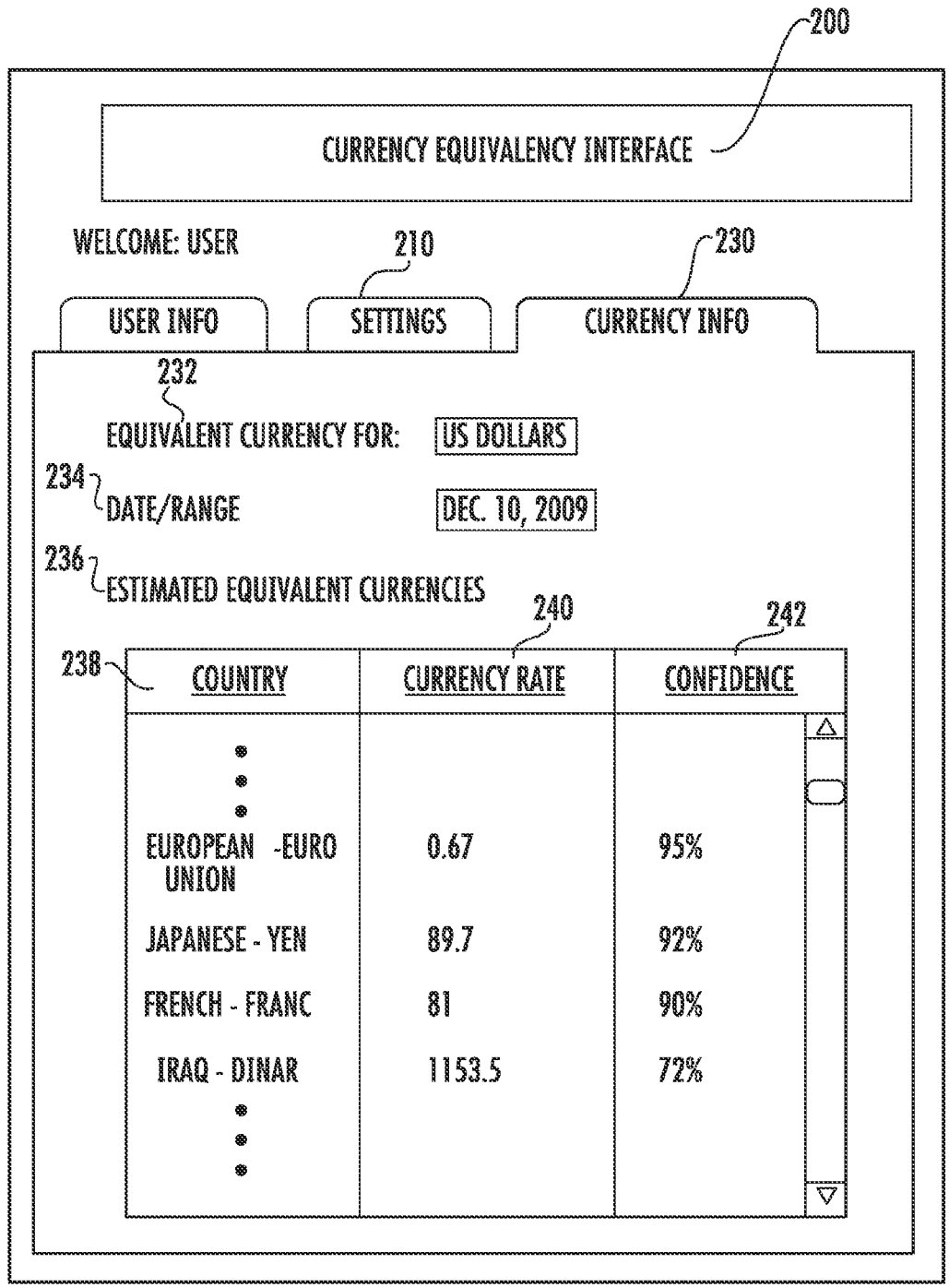
Figure 6:
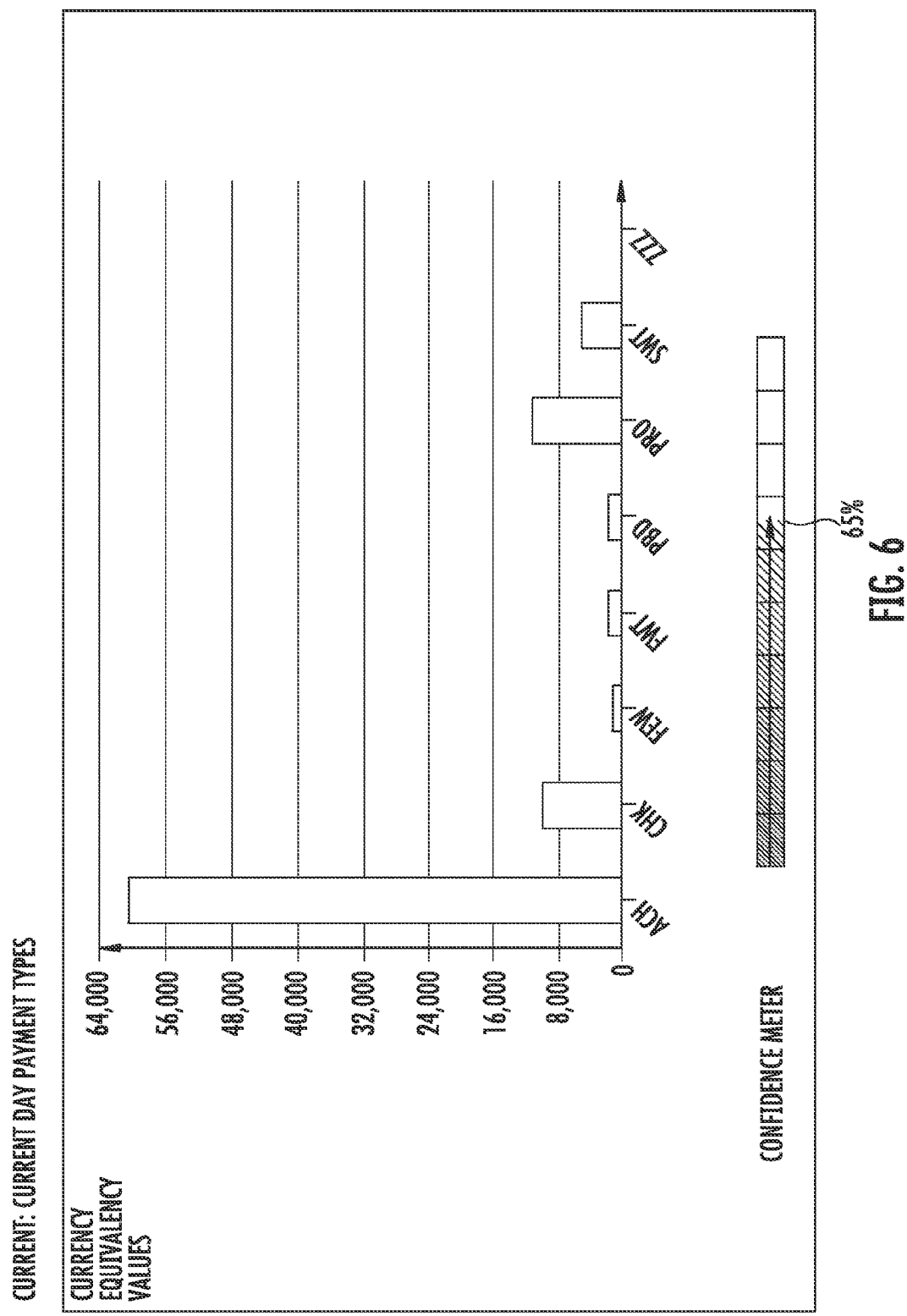
Figure 7A:
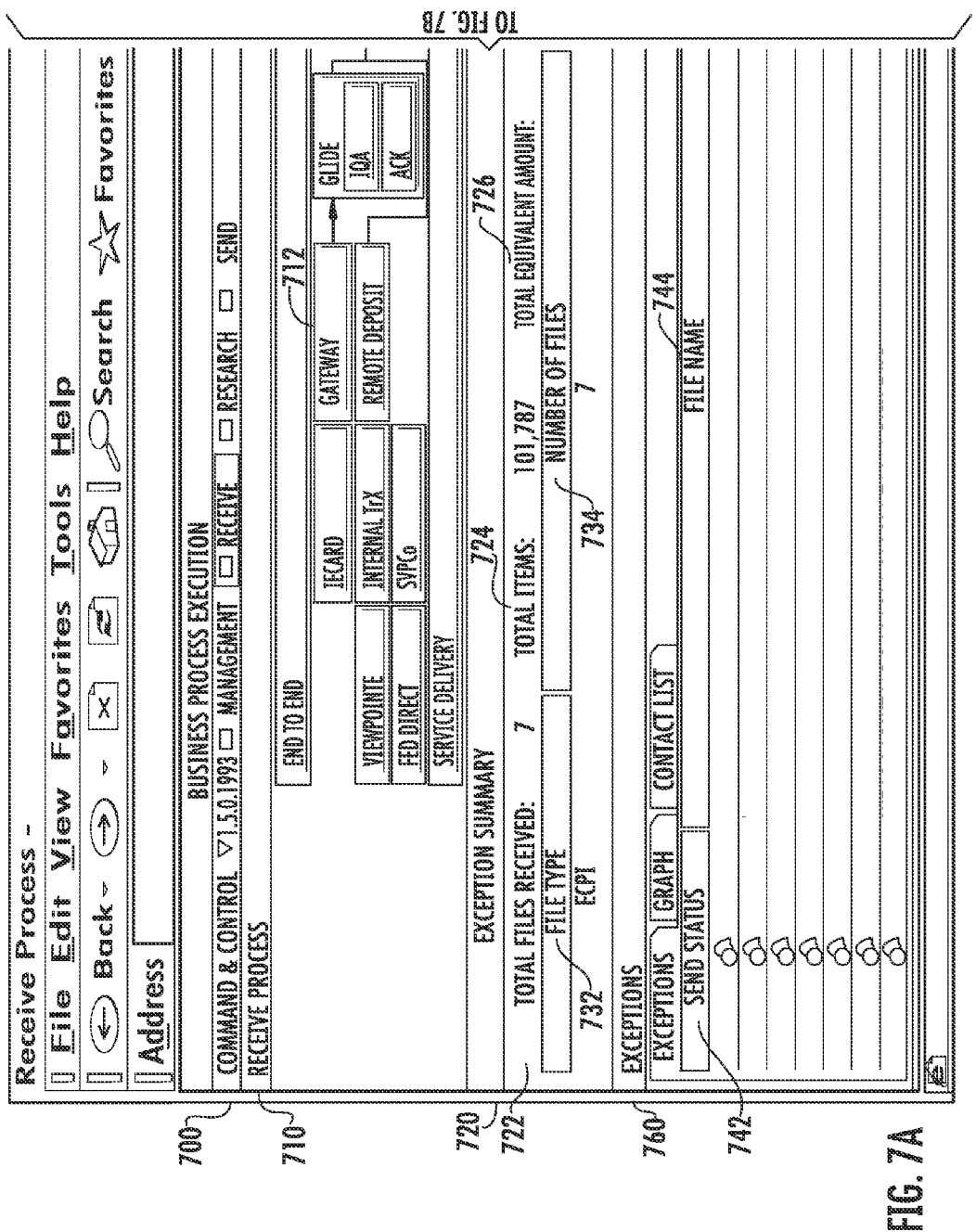

Having thus described embodiments of the invention in general terms, reference will now be made to the accompanying drawings, which are not necessarily drawn to scale, and wherein:

FIG. 1 provides a block diagram illustrating a BAM environment, in accordance with an embodiment of the present invention;

FIG. 2 provides a currency exchange settings interface illustrating user defined preferences that various users can set, in accordance with an embodiment of the present invention;

FIG. 3 provides a currency exchange information interface illustrating the actual or estimated currency exchange rates for various countries based on the user defined settings, in accordance with an embodiment of the present invention;

Figure 4:
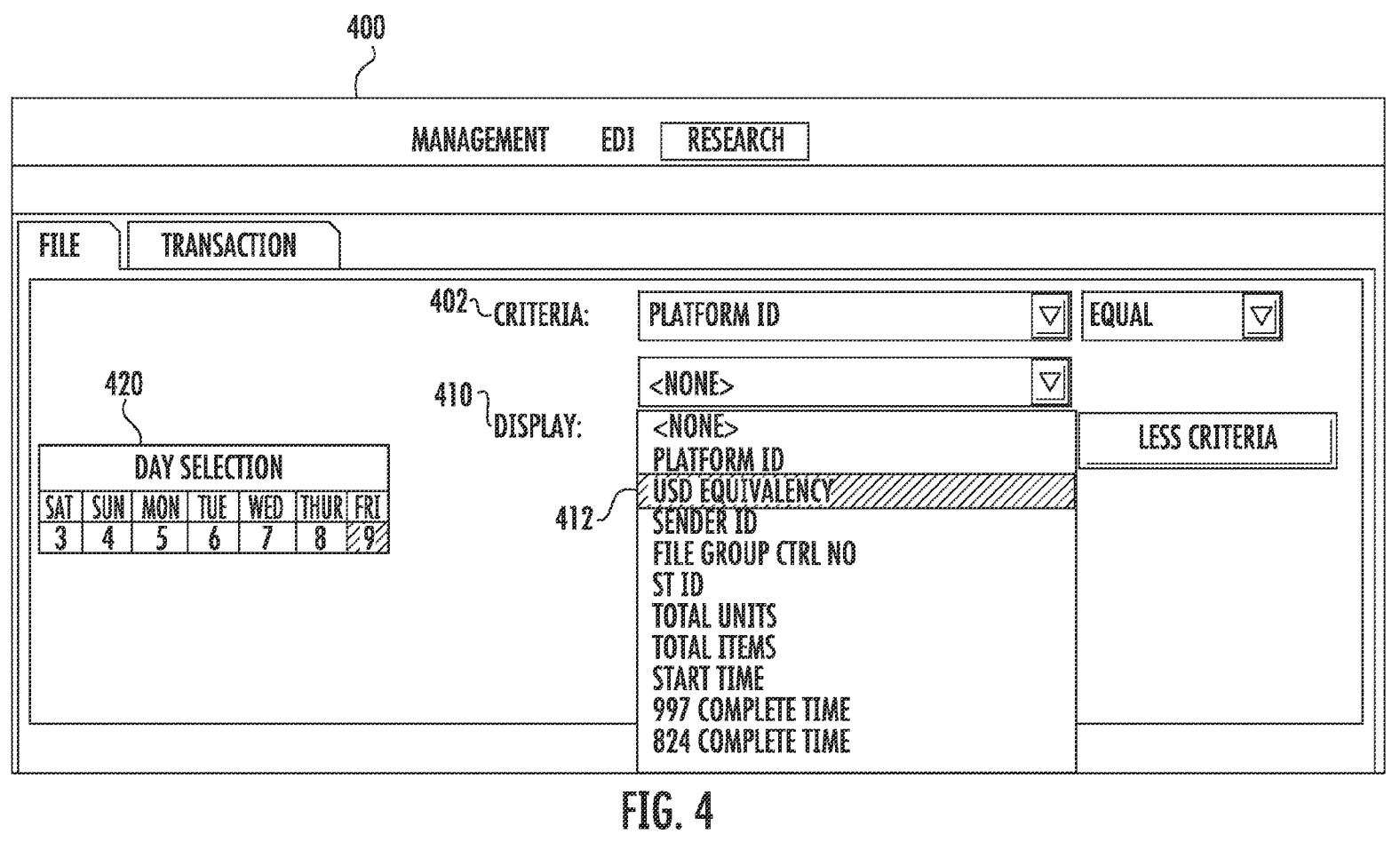

FIG. 4 provides an Electric Data Interchange ("EDI") monitoring input interface illustrating user defined criteria that users can enter when customizing the EDI monitoring output, in accordance with an embodiment of the present invention;

FIG. 5A provides an EDI monitoring output interface illustrating metrics including the estimated currency equivalency for transactions, in accordance with an embodiment of the present invention;

FIG. 5B provides a continuation of the EDI monitoring output interface illustrating metrics, including the estimated currency equivalency, for transactions, in accordance with an embodiment of the present invention;

FIG. 5C provides a continuation of the EDI monitoring output interface illustrating metrics, including the estimated currency equivalency, for transactions, in accordance with an embodiment of the present invention;

FIG. 6 provides an EDI monitoring output graph illustrating the estimated currency equivalency for transactions being sent to various processing channels, in accordance with an embodiment of the present invention;

Figure 7B:
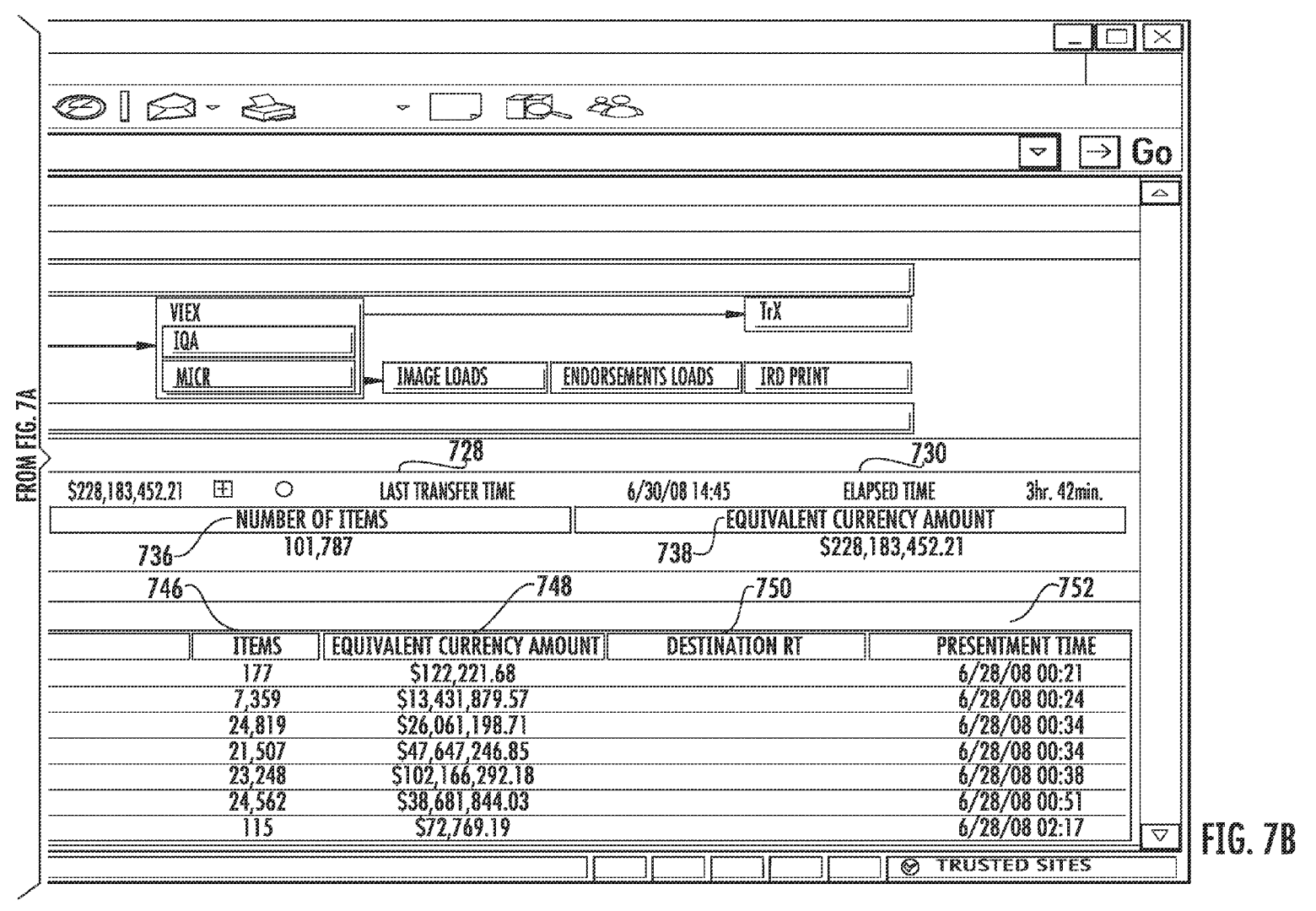

FIG. 7A provides a check processing monitoring output interface illustrating metrics, including the estimated currency equivalency, for transactions, using check processing, in accordance with an embodiment of the present invention; and FIG. 7B provides a continuation of the check processing monitoring output interface illustrating metrics, including the estimated currency equivalency, for transactions using check processing, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "bank," one of ordinary skill in the art will appreciate that other embodiments of the invention may involve other businesses or financial institutions that take the place of or work in conjunction with the bank to perform one or more of the processes or steps described herein as being performed by a bank.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

FIG. 1 illustrates a BAM environment in accordance with an embodiment of the present invention. As illustrated in FIG. 1, the currency equivalency server 4 is operatively coupled, via a network 2, to various BAM centers, such as but not limited to the Electronic Data Interchange (EDI) monitoring center 6, the command and control monitoring center 8, and other monitoring centers 9. In this way, a user located at one of the monitoring centers can receive user defined currency equivalency information from the currency equivalency application 100 located on the currency equivalency server, over the network 2. The network 2 may be a global area network (GAN), such as the Internet, a wide area network (WAN), a local area network (LAN), or any other type of network or combination of networks. The network 2 may provide for wireline, wireless, or a combination of wireline and wireless communication between devices in the network.

As illustrated in FIG. 1, a currency equivalency system 10 is accessed through the currency equivalency server 4, and generally comprises a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12, and the memory device 16. The processing device 14 uses the communication device 12 to communicate with the network 2, and other devices on the network 2, such as, but not limited to, the EDI monitoring center 6, the command and control monitoring center 8, and/or other monitoring centers 9. As such, the communication device 12 generally comprises a modem, server, or other device for communicating with other devices on the network 2.

As further illustrated in FIG. 1, the currency equivalency system 10 comprises computer-readable instructions 18 stored in the memory device 16, which in one embodiment include the computer-readable instructions 18 of a currency equivalency application 100. In some embodiments, the memory device 16 comprises a datastore 19 for storing data related to the currency equivalency system 10, including but not limited to data created and/or used by the currency equivalency application 100. As discussed later in greater detail, in one embodiment, the currency equivalency application 100 allows a user to set user preferences for various BAM applications. The user preferences allow the user to analyze transaction information, including various transactions containing different currencies and amounts, in one standard currency in which the user is comfortable analyzing.

As illustrated in FIG. 1, the BAM systems 40 are accessed through monitoring centers 9, and generally comprise communication devices 42, processing devices 44, and memory devices 46. The processing devices 44 are operatively coupled to the communication devices 42 and the memory devices 46. The processing devices 44 use the communication devices 42 to communicate with the network 2, and other devices on the network 2, such as, but not limited to, the currency equivalency server 4. As such, the communication devices 42 generally comprise a modem, server, or other device(s) for communicating with other devices on the network 2, and a display, keypad, mouse, keyboard, microphone, and/or speakers for communicating with one or more users.

As further illustrated in FIG. 1, the BAM systems 40 comprise computer-readable program instructions 48 stored in the memory devices 46, which in one embodiment comprises the computer-readable instructions 48 of BAM applications 47. In some embodiments, the memory devices 46 comprise datastores 49 for storing data related to the BAM systems 40, including but not limited to data created and/or used by the BAM applications 47.

The BAM applications 47 are used to monitor systems, such as, but not limited to global accounts receivable or global accounts payable which report daily results of accounts receivable and payable across multiple applications. Two of the BAM applications 47 include the EDI monitoring application 27 located in the EDI monitoring center 6 and the check processing monitoring application 37 located in the command and control monitoring center 8.

The purpose of the BAM applications 47 are to monitor processes that are occurring throughout the bank. In particular, a number of BAM applications 47 are dedicated to monitoring monetary transactions processed throughout various systems at the bank. These applications often track the number of transactions that get held-up in various processing systems, which helps users monitoring the transactions identify why the transactions have been held-up. The currency equivalency application 100 is used to help identify the transactions that are being held-up that have the largest impact to the bank's operations in terms of the monetary value of those transactions, so the bank employees can identify what transactions being held-up up should be addressed first.

In some embodiments of the invention, the BAM applications 47 monitor multiple "files" each with multiple "items." The files represent batch transactions and the items are the individual transactions within the batch transactions. The transactions could be held-up in processing at the bank for various reasons, but for the most part any hold-ups are related to computer system issues. The transactions cannot be translated or processed until the bank fixes the system problems. The transactions can also be held-up in the system for other reasons besides system issues, such as, but not limited to, extra characters in the file names or files that are in the wrong format, thus the system cannot properly read the file names in order to package the transactions for processing. Also, system outages for various servers across the business could occur because of power outages, natural disasters, switching systems to a new environment, etc. The BAM applications 47 are used to track all of these and other system issues, and help to understand how the issues impact the bank.

The transactions being processed throughout the bank are often in different currency types. The user monitoring the transactions held-up may know when each transaction needs to be processed, but because the transactions are in all in different types of currency the user may not know what particular transactions being held-up are most important to resolve. A user of a BAM application 47 has improved perspective for each of the transactions held-up in processing when the user is able to compare all of the currencies in the transactions to each other under an estimated equivalent currency. Comparing the currency amounts in one type of currency provides the user the ability to rank the various transactions into the ones that should be resolved first.

As illustrated in FIG. 1, the EDI monitoring system 20 is accessed through the EDI monitoring center 6, and generally comprises a communication device 22, a processing device 24, and a memory device 26. The processing device 24 is operatively coupled to the communication device 22 and the memory device 26. The processing device 24 uses the communication device 22 to communicate with the network 2, and other devices on the network 2, such as, but not limited to, the currency equivalency server 4. As such, the communication device 22 generally comprises a modem, server, or other device(s) for communicating with other devices on the network 2, and a display, keypad, mouse, keyboard, microphone, and/or speakers for communicating with one or more users.

As further illustrated in FIG. 1, the EDI monitoring system 20 comprises computer-readable program instructions 28 stored in the memory device 26, which in one embodiment comprises the computer-readable instructions 28 of an EDI monitoring application 27. In some embodiments, the memory device 26 comprises a datastore 29 for storing data related to the EDI monitoring system 20, including but not limited to data created and/or used by the EDI monitoring application 27.

The EDI monitoring application 27, in one embodiment, is used to monitor the payment transactions received by the EDI system. The EDI system is a file translation service, used for receiving payments in the form of transactions and batches of transactions from various companies across the world. The payments are made in various amounts and in various types of currency. The EDI system takes the payments, groups them into the appropriate bundles, and sends them to the proper payment processing systems based on the details of each payment received. The EDI monitoring system 20 tracks the status of the payment transactions received, as well as how the systems used to process the payment transactions are functioning.

As illustrated in FIG. 1, the check processing monitoring system 30 is accessed through the command and control monitoring center 8, and generally comprises a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the currency equivalency server 4. As such, the communication device 32 generally comprises a modem, server, or other device(s) for communicating with other devices on the network 2, and a display, keypad, mouse, keyboard, microphone, and/or speakers for communicating with one or more users.

As further illustrated in FIG. 1, the check processing system 30 comprises computer-readable program instructions 38 stored in the memory device 36, which in one embodiment comprises the computer-readable instructions 38 of a check processing monitoring application 37. In some embodiments, the memory device 36 comprises a datastore 39 for storing data related to the check processing system 30, including but not limited to data created and/or used by the check processing monitoring application 37.

The check processing monitoring application 37, in one embodiment, is used to monitor the electronic image check processing for both received and sent checks to and from the various processing institutions at the bank or at other financial institutions, such as other banks, automated clearing houses ("ACHs"), the Federal Reserve, etc. The check images are processed in batch transactions based on the payee or receiving bank and comprise individual transactions of various amounts in various types of currency. In order to improve the processing time for the check images, the checks are tracked from when they are received or sent until they have posted and settled. Checks are held-up (e.g. stuck in various processing steps) during check image processing for various reasons, such as computer issues or processing delays. Therefore, it is important to know not only the number of checks held-up in processing, but also the equivalent amount of the checks held-up because they are not always in the same currency amounts. The check processing monitoring application 37 tracks the status of the checks in the image receive and send processes, as well the systems that are used to process the check images.

Generally, the currency equivalency application 100, in some embodiments, is a stand-alone tool that is used by the various BAM systems 40, such as, but not limited to the EDI monitoring system 20 and the check processing monitoring system 30. In other embodiments of the invention the currency equivalency application 100 is incorporated into each individual BAM application 47.

Due to the shear volume of transactions and the different types of currency used within the bank, especially in the case of an international bank handling transactions to and from most of the countries in the world, issues arise in presenting data in a useful and condensed manner in monitoring applications for business processes that deal with multiple types of currencies. Therefore, when trying to monitor transactions throughout the bank within various BAM systems 40, using BAM applications 47, it is difficult to determine the actual monetary value of the transactions in a single currency that can be understood by multiple users of the same BAM application 47 in various countries that use different currencies, such as the US, India, China, Germany, etc.

The challenge for banks or other businesses in processing and monitoring transactions is that at any given time there can be thousands, hundreds of thousands, or even millions of transactions in the processing systems, and furthermore these transactions can be related to over a 100 different languages with over a 100 different types of currencies. If there is an issue with a system in the bank or business, hundreds, thousands, or hundreds of thousands of files could get "stuck" or "held-up" in the processing systems, not make it through processing, and thus prevent finalization of the transaction. These scenarios could cost the bank hundreds of thousands, or millions of dollars in processing delays. Therefore, as the monitoring systems currently stand, it is difficult to identify and assign the files that are held-up in the system a meaningful single monetary value because of the different currencies in which the transactions are made. For example, some of the transactions might be Liras, Euros, Yen, Dollars, etc. There is no tool within the BAM applications 47 that allows a user to take the all of the transactions being processed that deal with different currencies and view a display that shows the values in the desired currency of the specific user utilizing the BAM application.

In order to properly monitor various BAM applications, a user needs a tool that displays to the user, in the user's own language and currency, the impact of transactions held-up in the bank's processing systems. There are many challenges associated with determining a valid monetary value for numerous files of different currency amounts. For example, the shear size of the number of files being transferred, and determining equivalent currency rates for a number of transactions in different currencies (since the rates depend on when the transactions will clear, as well as any negotiated exchange rates, discounts, or payments made between the bank and the party making or receiving the transactions) both play a role in determining an equivalent currency value.

One or all of the challenges described above are addressed through the use of a currency equivalency application 100. In one embodiment of the invention the currency equivalency application 100, comprises two system components. One is used for capturing and storing the amounts and currency types for each of the transactions in the bank at a specific time. The other controls converting and storing the amounts based on a user's preferences. In one embodiment, the currency equivalency application 100 is a tool that a user can log into, either separately from a particular BAM application, within a BAM application, or at the same time the user logs into a BAM application. The currency equivalency application 100 accepts user defined preferences, such as, but not limited to the type of equivalent currency or multiple types of equivalent currencies the user prefers to see, how the information is displayed to the user, target confidence levels, etc.

The currency equivalency application 100 provides a barometer valuation of the amount of money in various processing systems in estimated currency values. It is a representative value, which in some embodiments is statistically calculated, so a user can quickly understand a large amount of financial activity in a format that makes the most sense to the user. The currency equivalency application 100 provides the bank the ability to take currency amounts across the BAM applications in a global platform and display it to various users in each user's own local preferences. For example, a user in Singapore logging into a BAM application 47 has a preference to see the output of the BAM application 47 in the Singapore dollar. The currency equivalency application 100 has the ability to convert the currency values being tracked within the particular BAM application 47 into the requested currency for the user in Singapore. The user will have an immediate context into what are the important issues associated with particular files being tracked in a currency that the user understands.

The currency equivalency application 100 works by providing an estimated equivalent currency value for one or more currencies involved in a transaction. In some embodiments of the invention the currency equivalency application 100 also provides a confidence level, indicating the accuracy of the equivalent currency value returned. The estimated equivalency is not an exact estimation of the equivalent currency in a transaction and it is most likely not what the final transaction amounts will be when the transactions are cleared. Instead the estimated equivalency value is a transaction estimator for BAM applications 47 that determines estimated values of transactions throughout various process steps, before the transaction is actually resolved, for the purpose of tracking and identifying the files with the greatest impact to the bank's revenue.

The bank has the ability to determine an estimated equivalency currency value because the bank has vast amounts of electronic transaction data that they collect when processing transactions. For example, whenever an electronic exchange of currency is made the bank will capture information, such as, but not limited to payer information, payee information, routing and transit information, the date of the transaction, the currency amount, the currency type, etc. Since the bank has this information stored for each transaction, they can utilize it to provide estimated equivalent currency amounts for tracking purposes.

A user does not know the actual currency exchange that a particular transaction will receive when the transaction clears at the end of processing because the effective entry date of the transaction when it clears may be one or more days away from the date the estimation is needed. In one embodiment of the invention, the currency equivalency application 100 only provides estimated currency values based on a table of the current rates for the day (or in other embodiments the currency rates are based on a statistical analysis of past rates) and provides a confidence interval based on the current exchange rates and the variation in the exchange rates over a period of time, such as, hours, days, weeks, years, etc. In some embodiments of the invention variations in seasonal changes or specific events can also be accounted for in determining the confidence intervals. The currency equivalency application 100 provides a quick estimation of the currency equivalency of the transaction and a confidence level indicating the volatility of the currency rate variations. The confidence level indicator gives a user a measure of the confidence of the estimated equivalency amount based on the volatility of the currencies used in the estimate. In more stable economic time periods or for more stable currencies the equivalency currency application 100 would provide greater confidence levels with respect to the estimated equivalency of the transactions.

In one embodiment, in order to determine an estimated equivalent currency for transaction being tracked by a BAM application 47, the BAM application 47 provides the currency equivalency application 100 the amount of the transaction and the type of currency used for the transaction. In most embodiments the transaction is a batch transaction that includes many transactions within the batch. Therefore, in most embodiments, the BAM application 47 provides the currency equivalency application 100 with numerous transaction payment amounts and the type of currency associated with each transaction payment amount in the batch. In other embodiments of the invention, the BAM application 47 provides the currency equivalency application 100 with the total payment amounts and the type of currency associated with the batch transaction total. The currency equivalency application 100 determines what equivalent currency to convert the transactions into, either through instructions from the BAM application preferences or through user defined instructions.

In order to identify the proper exchange rates to use, in one embodiment, the currency equivalency application 100 can link to currency conversion tables listed on the Internet made available to the public in general, or to specific customers through third party suppliers. In some embodiments, the conversion tables comprise real-time or near real-time rates that are determined by the market in general. Still in other embodiments of the invention, the conversion tables are an average currency rate over a period of time such as a day, week, month, etc. The currency conversion rates can be determined from various websites outside of the bank, or within the bank through the bank's own estimated conversion rates used in various systems. The currency equivalency application 100 transforms the currency values for a set of transactions being monitored by the BAM application 47, or in some embodiments all of the transactions in the processing system into the requested currency values. The currency equivalency application 100 uses the estimated currency values to populate any BAM applications 47 being used by various users across the businesses that are monitoring the transactions.

As previously indicated, in some embodiments, the currency equivalency application 100 provides a confidence score for the estimated currency value. The confidence score can be based off of any number of different statistical analysis methods. For example, the currency equivalency application 100 can examine how each of the currency values have varied over the past days, months, years, etc. Some examples of the statistical modeling could include random-walk modeling, six sigma confidence modeling (6 standard deviations, probability scores, such as P-scores), least fit squares modeling, seasonal trend modeling, other modeling techniques, or combinations of the various modeling techniques.

In one embodiment of the invention, the confidence level of the estimated currency exchange rate, and thus the estimated equivalent currency, is based at least in part on the historical variation between the values of the exchange rate as it changes over time. In other embodiments of the invention, the confidence level is based at least in part on the historical variation between the original transaction currency value when the transaction was made and the value of the equivalent currency at the time when the transaction is likely to clear and settle. In other words, the higher the variation between the historic exchange rates or currency values, the lower the confidence in the estimated equivalent currency for the date the transaction is likely to clear.

As previously described the system could work on the back end in conjunction with various bank BAM applications 47. In this embodiment of the invention the currency values being tracked by a BAM application 47 would be run through the currency equivalency application 100 before being displayed in the specific BAM application 47 display. In other embodiments of the invention, the currency equivalency application 100 could be integral within each specific BAM application 47. Additionally, in other embodiments of the invention the currency equivalency application 100 could be implemented in a pop-up window application that runs side-by-side with various BAM applications 47 and automatically converts the currency displayed in the various BAM applications 47 into the user defined currency values in the BAM application 47 window or in the pop-up window application.

FIG. 2 illustrates one embodiment of the currency equivalency interface 200 in the currency equivalency application 100. This embodiment of the invention could be either a stand-alone application that works in conjunction with all of the BAM applications 47, or it could be a part of and used within individual BAM applications 47. As illustrated in FIG. 2, the currency equivalency application 100, in one embodiment, has a user information section 202, a settings section 210, and a currency information section 220. The user information section 202, in one embodiment comprises user account information, such as the user's name and password, the user's location, the business line in which the user works, security information that gives the user access to log into various BAM applications, etc.

As illustrated in FIG. 2, the settings section 210, in one embodiment comprises a select currency to display section 212 that allows a user to specify in what equivalent currency the user would like to see the currency values in the BAM applications displayed. In one embodiment of the invention the currency equivalency interface 200 comprises a select currency date 214 that allows the user to select the when the user thinks the transactions will likely be processed. This information is useful for indicating to the currency equivalency application 100 what estimated exchanged rates to use for the conversion, and to help calculate the confidence levels that are associated with the estimated currency value. A date closer to the current date that the user is using the BAM application 47 for monitoring will likely provide an estimated currency value with a higher confidence level then a date that is a week, month, etc. away. In one embodiment the invention, the user may select a date in the past in order to view the estimated equivalent currency values based on the exchange rates for a particular date in the past. This information could be helpful to use when viewing BAM application 47 information for a particular day, event, or season, which has occurred in the past, in order to estimate similar exchange rates for a similar day, event, or season.

The BAM application 47, in some embodiments allows the user to pull transaction data from prior days. The currency equivalency application 100 can determine what the estimated equivalent currency values would have been for that particular day. This information can be helpful for reporting purposes of processing errors that have occurred in the past. In other embodiments, the user can compare the estimated equivalent currency values for a particular day in the past with the actual currency values for the transactions from the same day. In this way, the user or the currency equivalency application 100 can determine the accuracy of the estimated equivalent currency values over time in order to help predict the estimated equivalent currency values for future dates.

In other embodiments of the invention, the user can use the select a date range section 216 for providing average exchange rates over a particular time in the past or estimated future rates. For example, the transactions may be processed a month from now, but no one is sure when the actual transactions will be processed. If the user selects an average exchange rate over a week time period when the transactions are likely to be processed the currency equivalency application 100 provides an average exchange rate over that time period and includes a confidence score over that range of dates.

In still other embodiments of the invention, the user will not need to select a specific date or date range. For example, in some embodiments of the invention the user can select or enter the desired exchange rates himself or the currency equivalency application 100 calculates the estimated exchange rates automatically based on the current date and the approximate date in the future when the transactions will clear.

In some embodiments of the invention, different users (or lines of business) monitoring transactions in BAM applications 47 might need to operate under different levels of confidence related the estimated currency values of transactions at future dates. For example, a support group might be satisfied with an equivalency estimate of one-million dollars (1 MM) based on a seventy-five (75) percent confidence level, where the product owners might prefer an equivalency estimate of seven-hundred and fifty-thousand dollars (0.75 MM) with a ninety (90) percent confidence level. Therefore, in some embodiments the user has the ability to set the confidence level and the resulting calculations are adjusted accordingly. For example, the higher the confidence level set by the user the more conservative the estimate will be of the equivalent currency. In one embodiment the estimated currency value comprises a best-estimate value with varying percentages of accuracy. In other embodiments, a statistical analysis technique could be utilized to continuously adjust the estimated equivalent currency value until the value meets the user's desired confidence level.

In some embodiments of the invention, the user can set the preferences related to what currency to display for specific BAM applications 47 or all BAM applications 47 by using the select BAM application 218 drop-down list. The user may prefer to see one BAM application 47 display a US dollar estimated equivalent currency, while the user may prefer to see another BAM application 47 display another currency, such as the yen. In still other embodiments of the invention the currency equivalency application 100 allows the user to view the currency in a BAM application 100 in two or more different currencies. In one embodiment of the invention the user can select the submit button 220 to save the user's preferences to the currency equivalency application 100.

In some embodiments of the invention, the currency equivalency application 100 comprises a go button 222 that allows the user to select a particular BAM application 47 in the select BAM application section 218 drop-down list and be shown the particular BAM application 47 selected in the currency selected.

FIG. 3 illustrates one embodiment of the currency equivalency application 100 that comprises a currency information 230 tab, which outlines the estimated exchange rates for a particular date or date range. The currency information tab 230 illustrates the equivalent currency selected in the equivalent currency section 232 and the date or date range that the estimated currencies cover in the date/range section 234, based on what the user selected in the settings tab 210. As further illustrated in FIG. 3, there is an estimated equivalent currencies section 236 that lists all of the currencies in the world by country 238, currency exchange rate 240, and confidence level 242 for the date or date range and equivalent currency selected. In some embodiments of the invention, the confidence level is not necessary or not applicable. For example, if the date used for the exchange rate is a date from the past, then the confidence level is shown as "not applicable" or there is a one-hundred (100) percent confidence in the particular exchange rate for the date because the currency equivalency application 100 uses the exchange rates from that particular day. In other embodiments of the invention, the exchange rates for a day in the past could vary because different customers might be offered different rates of exchange based on their relationship with the bank. Therefore, in some embodiments of the invention the currency equivalency application 100 can calculate the exchange rates used for each customer in the past by reconciling the differences in the settlement values using the types of currencies in the transaction. The reconciled exchange rates for each customer can be used to estimate currency values in the future. In other embodiments of the invention, when the date selected for the estimated exchange rate is in the future the currency exchange rate 240 and confidence level 242 will take into account the variance over time of the exchange rates, seasonal adjustments, and/or other economic indicators to determine and provide the estimated exchange rates for various countries and the confidence levels for each of the estimated rates.

In one embodiment of the invention the date ranges or specific days used for requesting the currency exchange can be further broken down into specific times of the day, such as for example, the currency exchange rates at 9 am or 5 pm. Exchange rates for currencies can vary throughout a day, therefore, in some embodiments, in order to provide more accurate exchange rates or confidence levels, the user of the BAM application 47 specifies not only the date or date range for a particular exchange rate, but also a particular time of day for the date or date range.

In other embodiments of the invention a user can view various pop-up windows or other tabs related to the exchange rates for various countries over a period of time or estimated exchange rates in the future for various countries while viewing the BAM applications 47. The pop-up windows or other tabs in some embodiments, provide information, such as, but not limited to the volatility of various currency rates over a specified period of time, or the estimated exchange rates for a period of time, in tables, charts, and/or graphs.

There are many bank applications with which the currency equivalency application 100 can be incorporated. For example, the currency equivalency application 100 can be used with any international banking tool that deals with various currencies and must monitor those currencies on a real-time or near real-time basis. The currency equivalency application 100 is particularly useful for applications wherein knowing the currency equivalents for various currency transactions occurring all over the world influence decisions that must be made based on the impact to the banking operations for that particular application. As different processes and specific transactions within those processes are monitored the user of the currency equivalency application 100 can view all the transactions in an estimated currency value based on the exchange rates for a particular date and time.

In one example of a BAM application 47, if there are hundred (100) batch files that are held-up in processing at the bank all with different currency values, a user might not ever know which files were the most important to work on resolving because the user cannot compare the monetary value of each of the hundred (100) batch files. The hundred (100) batch files could represent five-hundred (500) million US dollars held-up in the system. It would be important know which files had the greatest equivalent US dollar amount, in order to make sure the systems processing the transactions with the greatest equivalent US dollar amount were made a priority over the other transactions. The currency equivalency application 100 allows the user to prioritize the transactions.

As described herein, the BAM applications 47 monitor systems that are processing one type of transaction or many types of transactions together, such as, but not limited to checks, wire transfers, credit card payments, cash transfers, etc. The currency equivalency application 100, in some embodiments, determines estimated equivalent currency values in one total value that takes into account all of the different types of transactions. In other embodiments of the invention, the currency equivalency application 100 determines the estimated equivalent currency for each type of transaction separately, so the user can view the transactions in both the type (i.e. check, credit card, cash transfer, etc.) of transaction being processed, as well as the total transactions being processed for the BAM application 47.

One BAM application 47 where the currency equivalency application 100 could be used is in the electronic data interchange ("EDI") monitoring application 27, which monitors the EDI processing system. The EDI processing system is a file translation service that takes payments from global corporations. EDI is not doing the actual posting and settlement of the transactions, but is instead packaging the transactions to send to the posting and settlement processes. It performs the front end batching and prioritization of the transactions. The EDI system takes the incoming batches and underlying transactions and re-packages them for processing at the bank. It then sends the transactions to the proper payment processing applications. For example, it takes the payments designated for ACH and puts the files in the proper form for the ACH transaction processing. In another example, the EDI system takes online transactions, pulls out the appropriate information from the transaction, puts it into the correct format used for online processing, and sends it to the online processing systems.

Typically, when companies send payment transaction information to the bank, the EDI processing system batches it into one larger file or sends it in multiple different types of files. The batch files are payment transactions that have a specific dollar amount for a specific currency type, which are the two variables that determine the ultimate transaction amount when the batch file clears. The corporations may send a batch of payments to the bank that include transactions in Japanese Yen, Italian Lira, Singapore dollar, etc. The processing of these currency amounts are done through electronic exchange networks that get bottlenecked from time to time in instances where processing deadlines are not met, or computer problems persist.

The EDI monitoring application 27 is used to monitor all of the batch transactions that are coming into the payment system from companies across the world who are paying in different currency types. The job of the EDI monitoring application 27 is to track and determine that every single batch file and all of the transactions within the batches make it through the EDI system and out the other side. It tracks the batch files in real-time to determine if one of the batches or individual transactions did or did not make it through processing. The EDI monitoring application 27 monitors the transactions, therefore, it is important for the user to know the equivalent currency of the transactions that are delayed in the system. There is no way currently within the EDI monitoring application 27 to quantify the impact of the transactions being held-up in processing in various currencies types for users throughout the world. Without the currency equivalency application 100 a user of the EDI monitoring application 27 has to manually review the electronic files, which the user cannot do because the files are transferred electronically over exchanges in computer-readable media. Even if a user could view all of the transactions, the user would have to make all of the currency exchanges by hand, for hundreds or thousands of transactions in hundreds or thousands of batch files, which there simply is not enough time to do.

FIG. 4 illustrates one embodiment of an EDI criteria interface 400 for an EDI monitoring application 27, however, in some embodiments of the invention the same or similar interface could be used in other BAM applications 47. As illustrated in FIG. 4, the user may define various criteria to display through the EDI monitoring application 27. For example, in some embodiments of the invention, the criteria selection 402 categories could comprise a specific platform that is used to process some transactions or a specific step in the transaction process. In other embodiments of the invention the user can select the type of equivalent currency the user wants to see the EDI monitoring application 27 display in the EDI monitoring interface 500 using the display drop-down menu 410. For example, in some embodiments of the invention the user can select a specific currency amount in which to display all of the monetary values within the EDI monitoring interface 500. In the embodiment displayed in FIG. 4, the user is selecting the US dollar equivalency 412. In other embodiments of the invention, the user can select other currency amounts in which to view the equivalent currency of the transaction payments being submitted to the bank, for example in Italian Lira, or Japanese Yen, Chinese Renminbi, the Euro, etc. In still other embodiments of the invention, the user may also select other information to display in the EDI monitoring interface 500, such as the platform identification, the sender identification, the total units in the process steps or platform, the total items in the units, etc.

In one embodiment of the invention the user may also select the date that the user wants to view the information for the specific BAM application 47, by using the day selection box 420. In other embodiments of the invention the day selection box 420 or another box could be used to pick a date so the currency equivalency application 100 can determine what exchange rates existed on that day or estimate the rates for that day for use in determining the equivalent currency amount displayed in the EDI monitoring application 27.

After the user selects the equivalent currency, for example the USD Equivalency 412, the EDI monitoring application 27 displays to the user the EDI monitoring interface 500, as illustrated in one embodiment in FIGS. 5A, 5B, and 5C. In one embodiment of the invention, the EDI monitoring interface 500 comprises an overview section 510, a summary section 530, and an exception detail section 550.

As illustrated in FIG. 5A, the overview section 510, provides a visual display of the processing steps within the given dashboard being displayed, in this case the EDI process. The display icons 512, in this case different colored circles, illustrate in some embodiments the number of transactions in the EDI process for the day, and the status of those transactions. For example, one of the processing systems may have processed eight-hundred and twenty (820) transactions, is in the process of completing nine-hundred and ninety-seven (997) transactions, and has another eight-hundred and twenty-four (824) transactions to process. In some embodiments the user selects the display icons 512 in order to drill-down into more specific details of each of the transactions, as illustrated in the exception detail section 530, which is discussed in further detail below. In some embodiments of the invention, the overview section 510 will display the overall estimated equivalent currency for all of the active transactions in the EDI system. Also illustrated in the overview section 510, in some embodiments of the invention, is the data read status section 516, which gives an overview of the files transferred to the EDI system for processing. In one embodiment the data read section 516 comprises the platform 518 that the files came from, the sequence number 520 of the files, the transfer time 522, the read time 524, the status 526, and the elapsed time 528 of the data acquisition.

The summary section 530 comprises the total files 532 in the system, which includes the batched transactions received from the various entities making payments to the bank. The total items 534 lists the number of individual transaction payments included in the total files 532 (all of the batch files) in the system at the particular time of the last data transfer. Also listed the summary section 530 is the total units 536, which is the total sum of all the transaction amounts without regard to the type of currency. For example, if the total units displays 10,000,000 it could mean 100 US dollars and 9,999,900 yen or 9,999,900 dollars and 100 yen, which obviously are two very different currency amounts. Without the currency equivalency application 100 the total units would be the only measure of relative monetary importance that the EDI monitoring application 27 could display. However, as previously described the currency equivalency application 100 allows the EDI monitoring system 20 to pull in an estimated total US dollar equivalency (or other currency equivalency) of all of the current transactions in the system. Thus, summary section 530 also comprises the total estimated currency 538. The summary section 530 comprises various other processing metrics that help track and analyze the transactions being processed by the EDI system.

As illustrated in FIGS. 5B and 5C, the exception detail section 550 comprises two more sections, the sender section 552, and the individual file section 570. The sender section 552 illustrates all of the batch files and transactions within those files for specific businesses that are sending the batch payments. The sender section 552 comprises the status 554 of the files, the sender ID 556, the platform 558 that the files are sent over, the number of files 560, the exception items 562 in those files (transactions being held-up), the total items 564 (total transactions in the files), the exception units 566 (amount of currency for the exceptions without regard for currency types), the total units 567 (total currency for the file without regard for currency types), the exception estimated equivalency amount 568, and the total estimated equivalency amount 569. The individual file section 570 illustrates specific metrics for each file from the specific sender located in the sender section 552. The individual file section 570 comprises the file control number 572, the number of exception items 574 for that file, the total items 576 for that file, the exception units 578, the total units 580, the exception estimated equivalency amount 582, the total exception estimated equivalency amount 584, the file status 586, the start time 588 of the file transaction, the elapsed time 590 of the file transaction, and the rejects 592 in the file. The drop down buttons 598 are used to show the individual companies making payments and each of the individual batch files submitted from each company.

The individual file section 570 also comprises a status key section 594, illustrating what the status colors mean in the various sections of the EDI monitoring interface 502. For example, if the files are held-up between twenty (20) minutes and one (1) hour the files are shown as a warning that there might be an issue and are marked with a yellow status color. If the files are held-up, for example, over one (1) hour then the status of the files are labeled critical and are marked with a red status color, which demands immediate attention.

The EDI monitoring application 27 can also use the estimated currency values provided by the currency equivalency application 100 to populate the various charts and graphs created by the EDI monitoring application 27. For example, FIG. 6 illustrates a current day payment type chart 600, which outlines for a specific day, where the volume of the electronic data transfers received by the bank are being transferred to for processing based on currency amounts. The chart in FIG. 6, illustrates that based on equivalency amounts most of the transactions in the EDI system are being sent to the ACH. This means that any issues with processing files for ACH should come first because those files represent the largest monetary value to the bank. In some embodiments the chart may also provide a confidence meter section 620 illustrating how confident the currency equivalency application 100 is estimating the values as previously described.

Another BAM application 47 which could use the currency equivalency application 100 is the check processing monitoring application 37. The check processing monitoring application 37 is used to monitor the electronic image check processing for both received and sent checks to and from the various processing institutions, such as other banks, automated clearing houses ("ACHs"), the Federal Reserve, etc. The check images are processed in batches based on the payee or receiving bank and comprise various amounts in all different types of currency. In order to improve the processing time for the check images, the checks are tracked from when they are received or sent until they have posted and settled. Checks are held-up during check image processing for various reasons, such as computer issues or transaction delays. Therefore, it is important to know not only the number of checks held-up in processing, but also the equivalent amount of the checks held-up because they are not always in the same currency amounts. The check processing monitoring application 37 tracks the status of checks in the image receive and send processes, as well the systems that are used to process the check images.

FIGS. 7A and 7B illustrate a check processing monitoring output interface 700 for tracking the number of check image exceptions held-up in the received check processing systems. The check processing monitoring output interface 700, comprises a receive process section 710, an exception summary section 720, and an exception detail section 740. The receive process section 710 comprises the process map outlining how check images are processed and the systems that are used to process the check images. The user may click on various processes steps or systems in the receive process section 710 to view any checks that are held-up in that particular step or system at the bank. For example, by selecting the Gateway system 712 in the process section 710, the check processing monitoring output interface 700 will display the exceptions occurring in the Gateway systems 712 in the exception summary section 720, and the exception detail section 740. The Gateway system 712 is the computer system used to receive electronic check processing images and files from individual customers that are using different processing systems to make transactions.

The exception summary section 720 comprises the total files received 722 that are held-up in the system, the total items 724, the total equivalency amount 726, the last transfer time 728, and the elapsed time 730 that occurs in the process step or system from the receive process section 710. The exception summary section 720 also breaks the total files received 722 down further based on file types 732, if any, and displays the number of files 734, number of items 736, and equivalent currency amount 738 for each file type.

The exception detail section 740 will further break down each file type into the specific files and illustrate the file status 742, file name 744, items 746 in the files, equivalent currency amount 748 for the file, destination routing and transit number 750, and presentment time 752.

As was described with regard to the EDI monitoring application 27. The amount of each of the image check files being processed can be converted into alternative equivalent currency amounts through the use of the currency equivalency application 100. Therefore, a user in the US can view the equivalency amounts in US dollars, while a user in India can view the equivalency amounts in rupees, US dollars, or any other type of currency. Again, as user can view the currency amounts for each of the files in an equivalent currency that the user is comfortable with, the user can prioritize what files held-up in the process steps and systems in the check image processing should be attended to first.

As banks move into more global applications the currency equivalency application 100 is useful for each BAM application 47 because of the global nature of the transactions being tracked throughout the bank. Furthermore, because of the global nature of most banks it is important that applications such as the currency equivalency application 100 be personalized for the employees located in various countries. Due to the vast quantities of data located at the bank, banks have the ability to provide personalized information immediately to employees in the formats that the employees are most comfortable with, without having to create separate applications for various languages and currency amounts.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A currency equivalency system for use with a business activity monitoring system comprising:
 a memory device comprising computer-readable program code stored therein;
 a communication device; and
 a processing device operatively coupled to the memory device and the communication device, wherein the processing device is configured to execute the computer-readable program code to:

displaying in a business activity monitoring interface information regarding monetary transactions being processed in a processing system of a financial institution or batch monetary transactions being processed in the processing system of the financial institution;

receive user input regarding an equivalent currency in which a user wants to display monetary transactions being processed in the processing system of the financial institution or batch monetary transactions being processed in the processing system of the financial institution in the business activity monitoring interface;

access currency exchange rates for the monetary transactions being processed in the processing system of the financial institution or batch monetary transactions being processed in the processing system of the financial institution not in the equivalent currency;

calculate equivalent currency values of the monetary transactions being processed in the processing system of the financial institution or batch monetary transactions being processed in the processing system of the financial institution; and display the equivalent currency values for the monetary transactions being processed in the processing system of the financial institution or batch monetary transactions being processed in the processing system of the financial institution in the business activity monitoring interface.

2. The currency equivalency system of claim 1, wherein the processing device is configured to execute the computer-readable program code to:
receive login information from the user and authenticate the user for access to the currency equivalency system.

3. The currency equivalency system of claim 1, wherein the processing device is configured to execute the computer-readable program code to:
receive information about the monetary transactions or batch monetary transactions related to a type of currency and a currency value for each monetary transaction being converted into the equivalent currency value.

4. The currency equivalency system of claim 3, wherein the monetary transactions or batch monetary transactions are monetary transactions or batch monetary transactions that have been processed at a time in the past, and wherein the equivalent currency values calculated are based on the exchange rates at the time in the past.

5. The currency equivalency system of claim 1, wherein the processing device configured to execute the computer-readable program code to access currency exchange rates comprises accessing the currency exchange rates in real-time.

6. The currency equivalency system of claim 1, wherein the processing device configured to execute the computer-readable program code to access currency exchange rates comprises estimating the currency exchange rates in the future by analyzing past exchange rates.

7. The currency equivalency system of claim 1, wherein the processing device configured to execute the computer-readable program code to calculate the equivalent currency values comprises using the currency exchange rates to convert each transaction into the equivalent currency value and sum the equivalent currency values for multiple monetary transactions based on what monetary transactions or batch monetary transactions are being monitored.

8. The currency equivalency system of claim 1, wherein the processing device is configured to execute the computer-readable program code to:
calculate confidence scores for the equivalent currency values.

9. The currency equivalency system of claim 8, wherein the confidence scores are calculated by determining the variation of the exchange rates used to calculate the equivalent currency values over time.

10. The currency equivalency system of claim 1, wherein the processing device is configured to execute the computer-readable program code to:
receive user input regarding a confidence score that the currency equivalency system uses to calculate the equivalent currency values.

11. A computer program product for a currency equivalency application for use with a business activity monitoring application, the computer program product comprising at least one non-transitory computer-readable medium having computer-readable program code portions embodied therein, the computer-readable program code portions comprising:
an executable portion configured for displaying in the business activity monitoring interface information regarding monetary transactions being processed in the processing system of the financial institution or batch monetary transactions being processed in the processing system of the financial institution;
an executable portion configured for receiving user input regarding an equivalent currency in which a user wants to display monetary transactions being processed in the processing system of the financial institution or batch monetary transactions being processed in the processing system of the financial institution in the business activity monitoring interface;
an executable portion configured for accessing currency exchange rates for the monetary transactions being processed in the processing system of the financial institution or batch monetary transactions being processed in the processing system of the financial institution not in the equivalent currency;
an executable portion configured for calculating equivalent currency values for the monetary transactions being processed in the processing system of the financial institution or batch monetary transactions being processed in the processing system of the financial institution; and
an executable portion configured for displaying the equivalent currency values for the monetary transactions being processed in the processing system of the financial institution or batch monetary transactions being processed in the processing system of the financial institution in the business activity monitoring interface.

12. The computer program product of claim 11, further comprising:
an executable portion configured for receiving login information from the user and authenticating the user for access to the currency equivalency application.

13. The computer program product of claim 11, further comprising:
an executable portion configured for receiving information about the monetary transactions or batch monetary transactions related to a type of currency and a currency amount for each monetary transaction being converted into the equivalent currency.

14. The computer program product of claim 13, wherein the monetary transactions or batch monetary transactions are monetary transactions or batch monetary transactions that have been processed at a time in the past, and wherein calculating the equivalent currency values is based on the exchange rates at the time in the past.

15. The computer program product of claim 11, wherein the executable portion configured for accessing currency exchange rates comprises an executable portion configured for accessing the currency exchange rates in real-time.

16. The computer program product of claim 11, wherein the executable portion configured for accessing currency exchange rates comprises an executable portion configured for estimating the currency exchange rates in the future by analyzing past exchange rates.

17. The computer program product of claim 11, wherein the executable portion configured for calculating the equivalent currency values comprises an executable portion configured for using the currency exchange rates to convert each monetary transaction into the equivalent currency value and sum the equivalent currency values for multiple monetary transactions based on what monetary transactions or batch monetary transactions are being monitored.

18. The computer program product of claim 11, further comprising:
an executable portion configured for calculating confidence scores for the equivalent currency values.

19. The computer program product of claim 18, wherein the confidence scores are calculated by determining the variation of the exchange rates used to calculate the equivalent currency values over time.

20. The computer program product of claim 11, further comprising:
an executable portion configured for receiving user input regarding a confidence score that the currency equivalency application uses for calculating the equivalent currency values.

21. A currency equivalency computer-implemented method, comprising:
providing a non-transitory computer-readable medium comprising computer program code stored thereon, wherein said computer program code is specifically configured to cause one or more computer processing devices to perform the following operations when performing the computer program code:
displaying in a business activity monitoring interface information regarding monetary transactions being processed in a processing system of a financial institution or batch monetary transactions being processed in the processing system of the financial institution;
receiving user input regarding an equivalent currency in which a user wants to display monetary transactions being processed in the processing system of the financial institution or batch monetary transactions being processed in the processing system of the financial institution in the business activity monitoring interface, using a processing device operatively coupled to a memory device, and a communication device, and configured to execute computer-readable program code;
accessing currency exchange rates for the monetary transactions being processed in the processing system of the financial institution or batch monetary transactions being processed in the processing system of the financial institution not in the equivalent currency, using the processing device;
calculating equivalent currency values for the monetary transactions being processed in the processing system of the financial institution or batch monetary transactions being processed in the processing system of the financial institution, using the processing device; and
displaying the equivalent currency values for the monetary transactions being processed in the processing system of the financial institution or batch monetary transactions being processed in the processing system of the financial institution in the business activity monitoring interface, using the processing device.

22. The currency equivalency computer-implemented method of claim 21, further comprising computer program code specifically configured to cause one or more computer processing devices to perform the following operations when performing the computer program code:
receiving login information from the user and authenticating the user for access to the currency equivalency system, using the processing device.

23. The currency equivalency computer-implemented method of claim 21, further comprising computer program code specifically configured to cause one or more computer processing devices to perform the following operations when performing the computer program code:
receiving information about the monetary transactions or batch monetary transactions related to a type of currency and a currency value for each monetary transaction being converted into the equivalent currency, using the processing device.

24. The currency equivalency computer-implemented method of claim 21, wherein the monetary transactions or batch monetary transactions are monetary transactions or batch monetary transactions that have been processed at a time in the past, and wherein calculating the equivalent currency values is based on the currency rates at the time in the past.

25. The currency equivalency computer-implemented method of claim 21, wherein accessing currency exchange rates comprises accessing the currency exchange rates in real-time, using the processing device.

26. The currency equivalency computer-implemented method of claim 21, wherein accessing currency exchange rates comprises estimating the currency exchange rates in the future by analyzing past exchange rates, using the processing device.

27. The currency equivalency computer-implemented method of claim 21, wherein calculating the equivalent currency values comprises using the currency exchange rates to convert each monetary transaction into the equivalent currency value and sum the equivalent currency values for multiple monetary transactions based on what monetary transactions or batch monetary transactions are being monitored, using the processing device.

28. The currency equivalency computer-implemented method of claim 21, further comprising computer program code specifically configured to cause one or more computer processing devices to perform the following operations when performing the computer program code:
calculating confidence scores for the equivalent currency values, using the processing device.

29. The currency equivalency computer-implemented method of claim 28, wherein the confidence scores are calculated by determining the variation of the exchange rates used to calculate the equivalent currency values over time.

30. The currency equivalency computer-implemented method of claim 21, further comprising computer program code specifically configured to cause one or more computer processing devices to perform the following operations when performing the computer program code:
receiving user input regarding a confidence score that the currency equivalency application uses for calculating the equivalent currency values.

* * * * *